United States Patent [19]

Burrer

[11] Patent Number: 4,859,846

[45] Date of Patent: Aug. 22, 1989

[54] DUAL-MODE RESONANT SCANNING SYSTEM

[76] Inventor: Gordon J. Burrer, 5 Wayland Hills Rd., Wayland, Mass. 01778

[21] Appl. No.: 222,260

[22] Filed: Jul. 21, 1988

[51] Int. Cl.$^4$ ................................................ H01J 3/14
[52] U.S. Cl. ................... 250/234; 250/230; 350/6.6
[58] Field of Search ............... 250/234, 235, 236, 347, 250/230; 350/6.5, 6.6, 6.9, 6.91; 358/208, 128, 128.5, 206; 318/607, 628

[56] References Cited

U.S. PATENT DOCUMENTS

| | | | |
|---|---|---|---|
| 3,889,156 | 6/1975 | Arya | 315/408 |
| 3,919,527 | 11/1975 | Bowen et al. | 235/61.11 E |
| 3,978,281 | 8/1976 | Burrer | 178/7.7 |
| 4,210,810 | 7/1980 | Berry et al. | 250/347 |
| 4,219,785 | 8/1980 | Scifres | 331/94.5 |
| 4,296,325 | 10/1981 | Berry | 250/347 |
| 4,310,912 | 1/1982 | Kikuchi et al. | 369/43 |
| 4,347,530 | 8/1982 | Stetson | 358/113 |
| 4,373,774 | 2/1983 | Dubroeucq et al. | 350/6.6 |
| 4,507,608 | 3/1985 | Flach | 324/220 |
| 4,625,104 | 11/1986 | Parker et al. | 250/234 |
| 4,642,530 | 2/1987 | Rodriguez-Cavazos | 315/371 |
| 4,655,587 | 4/1987 | Wijntjes et al. | 356/346 |
| 4,686,363 | 8/1987 | Schoon | 250/235 |

OTHER PUBLICATIONS

Technical Disclosure, entitled: "Precision Digital Position Encoding for Resonant Scanners" by Stanley Reich, SPIE, vol. 498, Laser Scanning and Recording, 1984, pp. 169–174.

Technical Disclosure, entitled: "Tunable Resonant Scanners" by Jean I. Montagu.

Primary Examiner—David C. Nelms
Assistant Examiner—William L. Oen
Attorney, Agent, or Firm—Weingarten, Schurgin, Gagnebin & Hayes

[57] ABSTRACT

A dual-mode resonant scanning system comprising an electronic control circuit and a dual-mode resonant mechanical scanner to produce an essentially triangular scan pattern. The dual-mode mechanical scanner is mechanically tuned to simultaneously oscillate at a predetermined fundamental frequency and a free running third harmonic thereof. The electronic control circuit drives the mechanical scanner to oscillate at the exact third harmonic of the predetermined fundamental frequency and phase locks the harmonic oscillation to the fundamental oscillation. The dual-mode resonant mechanical scanner includes an optical scanning element having a first mass, a second mass, at least one torsion rod, a rotational actuator and a mechanical ground designed and integrated together such that the mechanical scanner is self resonant at the predetermined fundamental frequency and at or within a few hertz of the exact third harmonic of the predetermined fundamental frequency. The electronic control circuit includes a mirror-position sensing subsystem, a bandpass filter tuned to the predetermined fundamental frequency, a multiplier circuit, a summing circuit, a manual phase and amplitude adjustment, a scan angle automatic gain control circuit and a driving circuit. The exact third harmonic oscillation in combination with the fundamental oscillation produces an essentially constant scan rate through a predetermined scan angle.

6 Claims, 1 Drawing Sheet

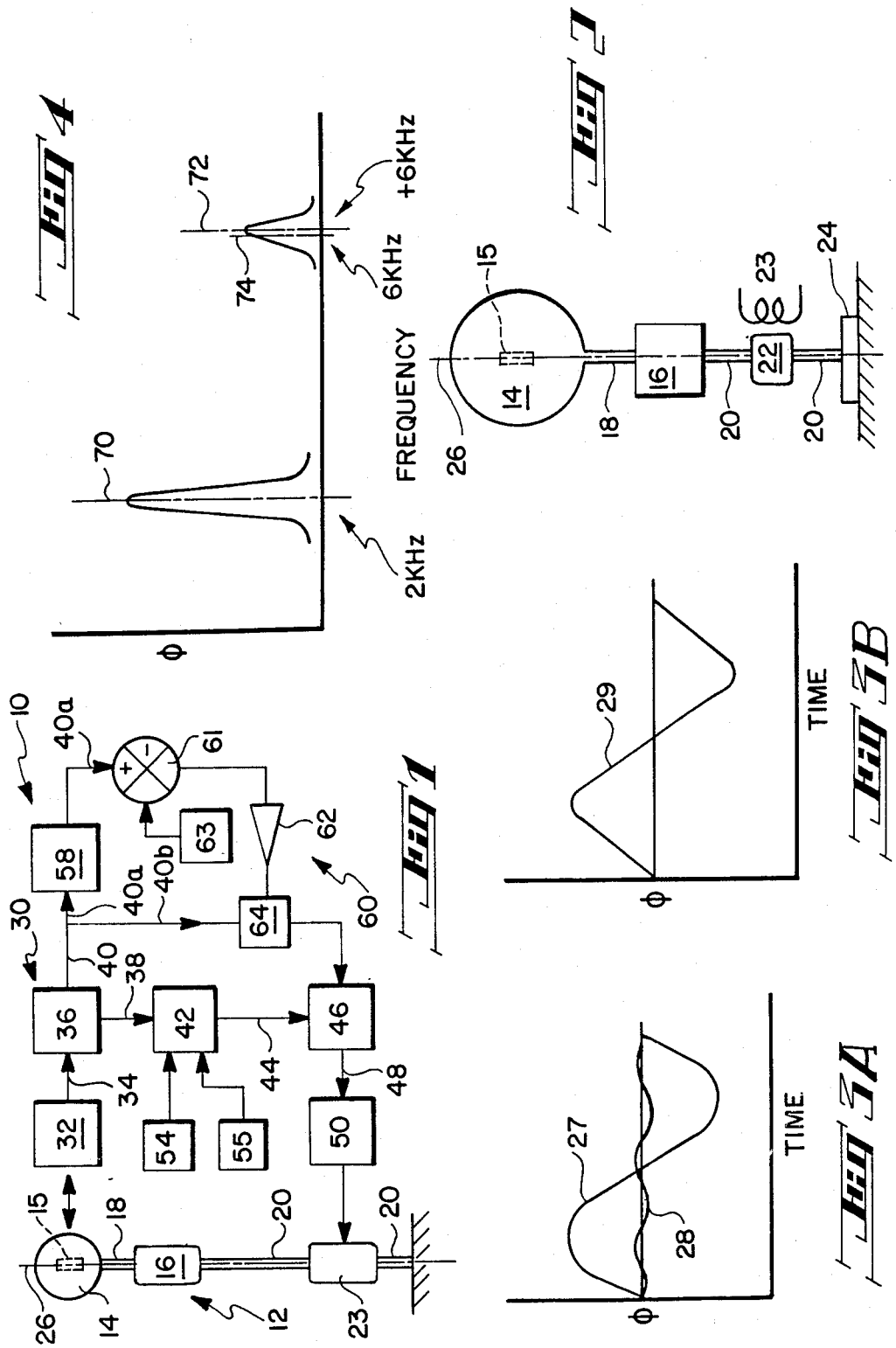

DUAL-MODE RESONANT SCANNING SYSTEM

RELATED APPLICATION

This application is related to patent application Ser. No. 183,834, filed Apr. 20, 1988, for a Radiation Scanning System.

FIELD OF THE INVENTION

This invention relates to radiation scanning systems, and more particularly to a dual-mode resonant mechanical scanner for simultaneous oscillation at a predetermined fundamental frequency and a phase locked exact third harmonic thereof.

BACKGROUND OF THE INVENTION

Resonant mechanical scanners are employed in a wide variety of applications. Resonant mechanical scanners are widely used because of their high reliability, long life and low power consumption. Sinusoidally oscillated mechanical scanners have minimum energization requirements and are mechanically and electronically simple in design, fabrication and operation. A sinusoidally driven scanning system, however, is inherently limited in that the scanning velocity varies throughout the entire scan angle. A sinusoidal drive signal has a scanning velocity which is a time varying value, i.e., non-constant, especially adjacent the sinusoidal maxima and minima. Thus, a sinusoidal scanning mirror experiences non-linear scanning due to a reduction in scan velocity as the sinuisoidal maxima and minima are approached. Non-linear scanning reduces the overall scan efficiency of the system.

Non-linear scan velocities due to sinusoidal drive signals may be compensated for by a variety of mechanical, optical and/or electronic techniques. One possible mechanical technique is overscanning wherein the amplitude of the sinusoidal drive signal is increased so that the mechanical scanner is driven through a wider-than-necessary scan angle. Thus, in effect only the linear velocity portion of the sinusoidal drive signal is utilized. Since a portion of the scan angle is not being utilized by the scanning system, however, such a mechanical technique results in very poor scan efficiency.

Another mechanical technique for improving scan linearity is to combine a number of resonant mechanical scanners having appropriate amplitudes, phase relations and frequencies (a predetermined fundamental frequency and one or more exact harmonics thereof) to form an optical scan pattern which is the result of the superposition of the beam deflection of each of the individual resonant mechanical scanners. Such a system is relatively complex both mechanically and electronically.. Another means of obtaining scan linearity involves the use of an optical element in conjunction with the resonant mechanical scanner. An optical element disposed in front of the mechanical scanner causes a divergence in the scanning beam at the end of the scan angle, the outward divergence of the beam by the optical element compensating for the reduction in scan velocity due to the sinusoidal drive signal. The optical element in such a system, however, must be designed and fabricated to precisely match the particular scan amplitude of the resonant mechanical scanner, a decided limitation. Further, using an optical element to diverge the scan also increases the beam width.

One electronic technique to compensate for the non-linear scan generated by a sinusoidal drive signal utilizes electronic circuitry to subdivide the period of the sinusoidal drive signal into a number of equal subparts. Those subparts of the period adjacent the sinusoidal maxima/minima are not used for scanning operations. This technique is somewhat similar to the mechanical overscanning technique in that the scanning system is non-operational during a portion of the sinusoidal drive signal, thereby resulting in very poor scan efficiency.

SUMMARY OF THE INVENTION

To overcome the inherent limitations of resonant mechanical scanners of the prior art, the present invention is directed to a dual-mode resonant scanning system wherein a dual-mode resonant mechanical scanner is simultaneously oscillated at a predetermined fundamental frequency and an exact harmonic thereof to provide constant velocity scanning through a predetermined scan angle. The dual-mode resonant scanning system is a high-Q system wherein Q is a figure of merit which reflects the energy losses in a resonant system, a high-Q system having minimal energy losses. The scanning system comprises a high-Q dual-mode resonant mechanical scanner and an electronic control circuit which generates the exact third harmonic of the predetermined fundamental frequency and phase locks the exact third harmonic oscillation to the predetermined fundamental frequency oscillation.

The high-Q dual-mode resonant mechanical scanner comprises a first mass including an optical scanning element, a second mass, at least one torsion rod element, a rotational actuator and a mechanical ground. By proper selection of the physical and dimensional characteristics of the first and second masses and at least one torsion rod element, the resonant mechanical scanner is self-resonant at a natural or predetermined fundamental frequency.

The high-Q dual-mode resonant mechanical scanner is further mechanically tuned for self resonance at a natural harmonic frequency of the predetermined fundamental frequency. Ideally, the natural harmonic frequency of the resonant mechanical scanner is the exact third harmonic of the predetermined fundamental frequency. Pragmatically however, interdependence between the physical parameters of the resonant mechanical scanner which define the predetermined fundamental and harmonic frequencies preclude design and fabrication of a resonant mechanical scanner self resonant at the predetermined fundamental frequency and the exact third harmonic thereof. However, satisfactory operation of the resonant mechanical scanner is achieved if the natural harmonic frequency of the mechanical scanner is within a few hertz of the exact third harmonic of the predetermined fundamental frequency.

The primary functions of the electronic control circuit include the mirror-position sensor, a bandpass filter designed to pass the predetermined fundamental frequency, a multiplier circuit, a summing circuit and a driving circuit. The mirror-position sensor detects the oscillatory scan motion of the scanning mirror of the resonant mechanical scanner which is a combination of the predetermined fundamental frequency and the harmonic thereof.

The bandpass filter circuit passes the predetermined fundamental frequency to the multiplier circuit and the summing circuit. The multiplier circuit multiplies the predetermined fundamental frequency to an exact third harmonic of the predetermined fundamental frequency.

The exact third harmonic signal is passed to the summing circuit where it is added to the predetermined fundamental frequency.

The electronic control circuit phase locks the exact third harmonic signal to the predetermined fundamental frequency signal to provide a triangular or substantially triangular oscillatory scan. The drive signal is passed to a driving circuit which electrically energizes the rotational actuator of the high-Q dual-mode resonant mechanical scanner. The resonant mechanical scanner is driven by the drive signal with the result that the optical scanning element scans through a predetermined scan angle at an essentially constant velocity.

The electronic control circuit also includes a phase adjustment input wherein the phase of the exact third harmonic signal developed by the multiplier circuit can be adjusted to optimize the triangular scan pattern. The electronic control circuit utilizes an AGC circuit for scan amplitude control of the fundamental frequency and optionally the exact third harmonic frequency.

BRIEF DESCRIPTION OF THE DRAWINGS

A more complete understanding of the present invention and the attendant advantages and features thereof will be more readily understood by reference to the following detailed description when considered in conjunction with the accompanying drawings wherein:

FIG. 1 is a schematic view of an exemplary embodiment of a dual-mode resonant scanning system according to the present invention;

FIG. 2 is a top plan view of an exemplary embodiment of a dual-mode resonant mechanical scanner according to the present invention;

FIG. 3A is a graphical illustration of a predetermined fundamental frequency signal and an exact third harmonic signal thereof for a dual-mode resonant mechanical scanner;

FIG. 3B is a graphical illustration of the substantially triangular drive signal produced by an additive combination of the signals of FIG. 3A; and FIG. 4 is an exemplary Q diagram of the dual-mode resonant mechanical scanner depicted in FIG. 2 illustrating the natural fundamental and harmonic frequencies.

DETAILED DESCRIPTION OF PREFERRED EMBODIMENTS

Referring now to the drawings wherein like reference numerals designate corresponding or similar elements throughout the several views, there is shown in FIG. 1 an exemplary diagram of a dual-mode resonant scanning system 10 according to the present invention. The resonant scanning system 10 includes a high-Q dual-mode resonant mechanical scanner 12 which is a high-Q torsional device designed and fabricated to be sharply resonant at a natural fundamental frequency and a natural harmonic thereof. When operating under resonant conditions, the high-Q torsional device produces a maximum amplitude response from a minimal input stimulus. The resonant scanning system 10 further comprises an exemplary electronic control circuit 30 and an exemplary scan angle automatic gain control circuit 60 as shown in FIG. 1. The high-Q dual-mode resonant mechanical scanner 12 simultaneously oscillates at the natural fundamental frequency and a harmonic of the natural fundamental frequency.

The high-Q dual-mode resonant mechanical scanner 12 as shown in FIG. 2 comprises a first mass 14, a second mass 16, a first torsion rod element 18 interconnecting the first and second masses 14,16, and a second torsion rod element 20 interconnecting the second mass 16 with a mechanical ground 24. All the foregoing elements are symmetrically disposed about and define a longitudinal axis 26 for the resonant mechanical scanner 12. A rotational actuator, e.g., a rotor/stator 22, 23 assembly, is coaxially disposed on the second torsion rod 20.

The stator 23, as shown in FIG. 2, is coaxially disposed about the rotor 22 to provide a means for electrically energizing the dual-mode resonant mechanical scanner 12 to effect torsional movement thereof for scanning operations. The dual-mode resonant mechanical scanner 12 is fixedly secured through the mechanical ground 24 such that the first and second masses 14, 16 and the first and second torsion rod elements 18,20 are torsionally rotated about the longitudinal axis 26 of the resonant mechanical scanner 12.

The first mass 14 includes an optical scanning element such as a beryllium mirror. The beryllium mirror 14 is designed and fabricated to have the largest possible surface reflecting area with the smallest possible mass. Another design consideration is that the beryllium mirror 14 must have sufficient mechanical rigidity to preclude mechanical distortion thereof during scanning movement. A complementary signal element 15, discussed further hereinbelow, is affixed to a non-reflecting portion of the beryllium mirror 14.

The torsion rod elements 18, 20 are formed as a solid rod from a material such as ASTM A681(01) tool steel heat treated to R 56–57. It is to be understood that the present disclosure is directed to first and second torsion rod elements 8, 20 formed from a single rod. Alternatively, the torsion rod elements 18, 20 could be formed using two rods 18, 20 suitably affixed together coaxially.

The fundamental parameters used to describe a simple torsionally resonant mechanical system are angular displacement, $\phi$, polar moment of inertia, J, shear modulus, G, and torsional element length, L. Other parameters such as torque, $F_r$, angular velocity, $d\phi/dt$, and resonant frequency, f, can be expressed in terms of the fundamental parameters.

The dual-mode resonant mechanical scanner 12 of FIG. 2 is complex and described by a fourth order equation comprised of the polar moments of the first and second masses 14, 16 and the rotational compliances (spring constants) of the torsion rod elements 18, 20. By proper selection of the materials, lengths and diameters of the torsion rod elements 18, 20 and the material and dimensions of the optical scanning element 14 and the second mass 16 to define the values of the polar moments and rotational compliances, the natural fundamental frequency of the dual-mode resonant mechanical scanner 12 is delimited as a sharp response curve 70, characteristic of a high-Q system, as shown in FIG. 4.

As used herein, the phrase natural fundamental frequency is interchangeable with the phrase predetermined fundamental frequency in the sense that the dual-mode resonant mechanical scanner 12 is designed and fabricated for self-resonant oscillatory scanning motion at some predefined fundamental frequency. For example, the dual-mode resonant mechanical scanner 12 could be designed and fabricated to have a natural or predetermined fundamental frequency of 2 KHz. Other exemplary predetermined fundamental frequencies might be 4 KHz or 8 KHz.

By mechanically tuning the dual-mode resonant mechanical scanner 12, that is, modifying the dimensions and/or mass of the optical scanning element 14 and the second mass 16 and/or the first and second torsion rod elements 18,20, the resonant mechanical scanner 12 can be mechanically tuned for self-resonance at a second frequency which is near a natural harmonic frequency of the predetermined fundamental frequency. The natural harmonic frequency also exhibits a sharp response curve 72 characteristic of a high-Q system, as shown in FIG. 4. Ideally the resonant mechanical scanner 12 would be mechanically tuned to an exact harmonic frequency of the predetermined fundamental frequency. Due to the interdependence between the mechanical elements of the resonant mechanical scanner 12, however, the natural harmonic frequency typically is not an exact harmonic of the predetermined fundamental frequency, but rather is generally within a few hertz of the exact harmonic.

An exemplary natural or predetermined fundamental frequency and the natural harmonic frequency for the dual-mode resonant mechanical scanner 12 are illustrated in the Q response curve diagram of FIG. 4. For a preferred embodiment of the present invention, the natural harmonic frequency is equal to or within a few Hz of the exact third harmonic of the predetermined fundamental frequency. For example, a dual-mode resonant mechanical scanner 12 designed and fabricated to have a predetermined natural frequency of 2 KHz is mechanically tuned to have a natural harmonic frequency equal to or within a few hertz of 6 KHz.

Referring to FIG. 1, the primary functions of the exemplary electronic control circuit 30 include a sensing element 32, a bandpass filter circuit 36, a multiplier circuit 42, a summing circuit 46, and a driving circuit 50. The sensing element 32 acting in concert with the complementary signal element 15 detects the angular position of the optical scan element 14. In one embodiment, the complementary signal element 15 is a reflecting surface affixed to the backside of the beryllium mirror 14.

As will be explained in further detail hereinbelow, the angular scan velocity of the beryllium mirror 14 of the dual-mode resonant mechanical scanner 12 is designed to be linear or substantially linear. The scanning motion of the beryllium mirror 14 is an oscillatory motion comprised of the predetermined fundamental frequency 27 and the phase locked exact third harmonic frequency 28 as shown in FIG. 3A. These scan motions, in additive combination, provide a substantially triangular scan motion 29 at a frequency equal to the predetermined fundamental frequency to cause the beryllium mirror 14 to scan linearly.

The complementary signal element 15 and the sensing element 32 in concert provide an output signal representing the oscillatory scanning motion of the beryllium mirror 14. The output signal from the sensing element 32 is passed via signal path 34 to the bandpass filter circuit 36. The elements of the bandpass filter circuit 36 are selected such that only the predetermined fundamental frequency signal is outputted to the first and second signal paths 38,40.

During driven operation of the dual-mode resonant mechanical scanner 12 the resonant mechanical scanner 12 simultaneously oscillates at the predetermined fundamental frequency and the exact third harmonic thereof. During startup of the resonant mechanical scanner 12, however, the scanner 12 initially oscillates in self-resonance at the natural fundamental frequency and the natural harmonic frequency. Since the predetermined fundamental frequency is the natural fundamental frequency, the bandpass filter circuit 36 passes the requisite frequency during driven operation and during startup.

Start up of the resonant mechanical scanner 12 is accomplished by creating an initial torsional deflection of the torsion rod elements 18, 20 which in turn initiates torsional vibration at the natural frequencies. The noise signal from the sensing element 32 is one means which may be utilized to create the initial deflection.

The predetermined fundamental frequency output signal is transmitted on the first signal path 38 to the multiplier circuit 42. The multiplier circuit 32 multiplies the predetermined fundamental frequency output signal to the exact third harmonic of the predetermined fundamental frequency. That is, the multiplier circuit 42 multiplies the predetermined fundamental frequency output signal by a factor of 3 such that the frequency of the output signal from the multiplier circuit 42 on signal path 44 is the exact third harmonic of the predetermined fundamental frequency.

As shown in FIG. 1, the electronic control circuit 30 includes a phase adjustment input 54 to the multiplier circuit 42. The phase adjustment 54 is used to set the phase angle of the exact third harmonic frequency output signal from the multiplier circuit 42 with respect to the predetermined fundamental frequency output signal passed by the bandpass filter circuit 36. The phase adjustment 54 allows the phase angle of the exact third harmonic frequency output signal to be adjusted to optimize the triangular scan motion as sensed by the sensing element 32. In like manner, an amplitude adjustment input 55 is set to further optimize the triangular scan motion sensed by the sensing element 32. Optionally, it may be desirable for some applications to replace the amplitude adjustment input 55 with an automatic gain control circuit similar to the scan angle automatic gain control circuit 60 described below.

The phase adjusted and phase locked exact third harmonic output signal is one input to the summing circuit 46. The predetermined fundamental frequency output signal transmitted on signal path 40 through the scan amplitude automatic gain control circuit 60 is the second input to the summing circuit 46.

An exemplary AGC circuit 60 as shown in FIG. 1 is part of the electronic control circuit 30. The predetermined fundamental frequency output signal transmitted along signal path 40 is directed to signal paths 40a, 40b. The predetermined fundamental frequency of signal path 40a is sequentially passed through a peak detection circuit 58, a difference amplifier circuit 61 with an amplitude adjust input 63, and an amplifier circuit 62 to a gain control circuit 64.

To a large extent the amplitude of the predetermined fundamental frequency signal 27 determines the scan angle for the optical scan element 14. The amplitude required for the triangular scan 29 is preset in the difference amplifier circuit such that the differential amplifier circuit 61 detects any differences between the preset amplitude 63 and the amplitude of the predetermined fundamental frequency output signal as detected by the peak detector circuit 58.

A difference signal is outputted from the difference amplifier circuit 61 to the amplifier circuit 62 which regulates the gain control circuit 64. The gain control circuit 64 effects an appropriate amplification of the amplitude of the predetermined fundamental frequency signal on signal path 40b such that the predetermined fundamental frequency signal outputted by the AGC circuit 60 has the preset amplitude.

A second AGC circuit similar to the one used with the predetermined fundamental frequency may optionally replace the amplitude adjustment input 55 to control the amplitude of the exact third harmonic signal generated by the multiplier circuit 42.

The summing circuit 46 additively combines the predetermined fundamental frequency and the third harmonic thereof to generate a drive signal which produces the scan motion 29 shown in FIG. 3B. In contrast to a sinusoidal drive signal wherein the scanning velocity $d\phi/dt$ is a time varying value, the scanning velocity $d\phi/dt$ of the triangular drive signal 29 is essentially constant (exact at the maxima and minima).

The signal from the summing circuit 46 is carried to the driver circuit 50 via signal path 48. The driving circuit 50 provides electrical energy to the stator 23 of the dual-mode resonant mechanical scanner 12.

The optical scan element 14 is thus driven in the triangular scan pattern 29 such that the beryllium mirror 14 scans at a constant velocity, i.e., linearly, through a predetermined scan angle. The predetermined scan angle for one embodiment of the present invention is 30 degrees peak-to-peak.

Referring to FIG. 4 the Q response curve diagram for a dual-mode resonant mechanical scanner 12 is depicted wherein the predetermined or natural fundamental frequency curve 70 is centered at 2 KHz. For purposes of explanation, the natural third harmonic frequency curve 72 is centered at 6+ KHZ due to design constraints discussed above. The exact third harmonic frequency signal 74 at 6 KHz is generated by the multiplier circuit 42, and the resonant mechanical scanner 12 in effect is caused to simultaneously oscillate at the predetermined fundamental frequency and the exact third harmonic thereof rather than the natural third harmonic, i.e., the scanner 12 is driven to oscillate off of the natural third harmonic frequency. Operation of the scanner 12 in this manner requires minimal energy to drive the scanner 12 since it is designed and fabricated for self-resonant oscillation both at the predetermined fundamental frequency and near the natural third harmonic frequency.

It will be appreciated that driving the high-Q dual-mode resonant mechanical scanner 12 off of the natural harmonic frequency, i.e., at the exact third harmonic frequency, does not effect the Q response curves illustrated in FIG. 4 for either the predetermined fundamental frequency or the natural third harmonic. That is, the absolute and relative positional relationships of and between the Q response curves does not change.

It will be further appreciated, however, that the absolute positional relationships of the Q response curves may be altered by modifying the environmental temperature of the high-Q dual-mode resonant mechanical scanner 12. As an example, the torsion rod elements 18, 20 may be formed from one of the shape memory effect alloys such as nitinol (equal ratio of nickel and titanium) which have a moduli of elasticity which varies significantly with temperature. By purposefully altering the temperature of the torsion rod elements 18, 20, the predetermined fundamental frequency and the natural harmonic frequency are correspondingly varied, i.e., shifted in position along the abscissa of FIG. 4. One useful application for such temperature sensitive scanners is where the drive signal is synchronized to an external clock signal.

A change in temperature will cause a shift in both Q response curves with respect to the abscissa of FIG. 4, i.e., the natural self-resonant frequencies, both the fundamental and harmonic, of the resonant mechanical scanner will be changed. However, design parameters for the resonant mechanical scanner 12 can be selected such that for all practical purposes a temperature change will not affect the relative positional relationship between natural self-resonant frequencies.

A variety of modifications and variations of the present invention are possible in light of the above teachings. It is therefore to be understood that within the scope of the impending claims, the present invention may be practiced otherwise than as specifically described hereinabove.

What is claimed is:

1. A dual-mode resonant scanning system for use in a radiation imaging system, comprising:

high-Q dual-mode resonant mechanical scanning means for simultaneously oscillating at a predetermined fundamental frequency and near a third harmonic frequency of said predetermined fundamental frequency, said high-Q dual-mode resonant mechanical scanning means being designed and fabricated for self-resonance at said predetermined fundamental frequency and wherein said high-Q dual-mode resonant mechanical scanning means is mechanically tuned for self-resonant oscillation near the third harmonic frequency of said predetermined fundamental frequency; and control means associated with said high-Q dual-mode resonant mechanical scanning means for controlling the simultaneous oscillation thereof, said control means including means for generating an exact third harmonic frequency signal based upon a signal having said predetermined fundamental frequency, and means for phase locking said exact third harmonic frequency signal with said predetermined fundamental frequency with an appropriate scan amplitude and phase angle therebetween to produce a triangular scan motion from said high-Q dual-mode resonant mechanical scanning means to provide near constant velocity scanning over a predetermined scan angle.

2. The dual-mode resonant scanning system of claim 1 wherein said control means further comprises:

means for sensing the oscillatory movement of said high-Q dual-mode resonant mechanical scanning means and generating an oscillatory signal corresponding thereto; and bandpass filter means for selectively transmitting said predetermined fundamental frequency signal portion of said oscillatory signal to said exact third harmonic frequency signal generating means and blocking signals at any other frequency.

3. The dual-mode resonant scanning system of claim 2 wherein said control means further comprises summing means for combining said predetermined fundamental frequency signal from said bandpass filter means and said exact harmonic frequency signal generated by said exact harmonic frequency signal generating means to produce said drive signal for energizing said high-Q dual-mode resonant mechanical scanning means for simultaneous oscillation to provide constant velocity scanning over said predetermined scan angle.

4. The dual-mode resonant scanning system of claim 3 wherein said control means further comprises driving means associated with said summing means for energizing said high-Q dual-mode resonant mechanical scanning means by said drive signal to cause said high-Q dual-mode resonant mechanical scanning means to simultaneously oscillate at said predetermined fundamental frequency and said phase locked exact third harmonic frequency to provide constant velocity scanning over said predetermined scan angle.

5. The dual-mode resonant scanning system of claim 2 wherein said control means further comprises automatic gain control means associated with said bandpass filter means to regulate the amplitude of said predetermined fundamental frequency signal selectively transmitted by said bandpass filter means at a predetermined value, said predetermined value of the amplitude of said predetermined fundamental frequency signal defining said predetermined scan angle of said high-Q dual-mode resonant mechanical scanning means.

6. The dual-mode resonant scanning system of claim 1 wherein said control means further comprises harmonic automatic gain control means associated with said exact harmonic frequency signal generating means to automatically regulate the amplitude of said exact harmonic frequency signal generated thereby.

* * * * *